UNITED STATES PATENT OFFICE.

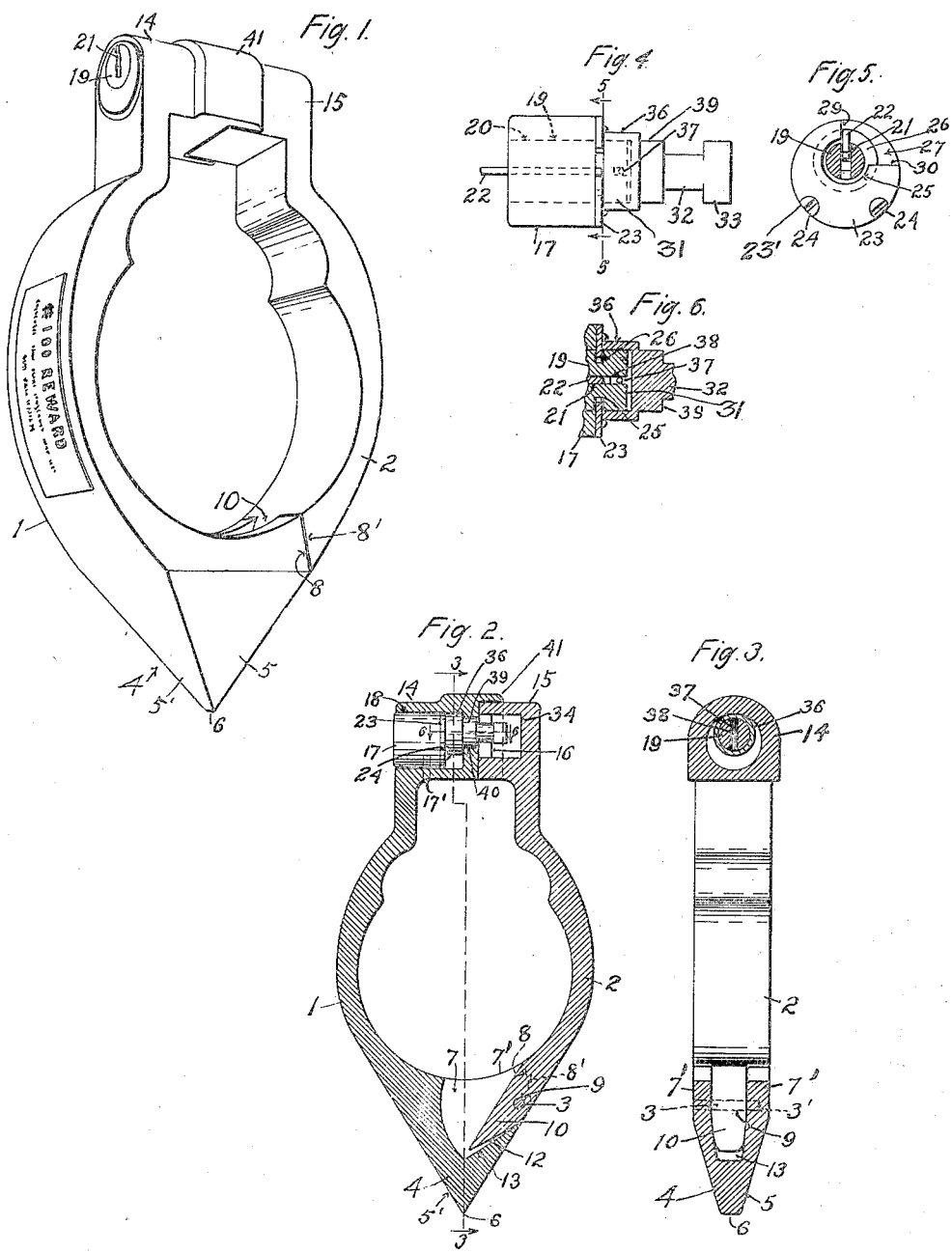

EARLE E. CHAPMAN, OF LOS ANGELES, CALIFORNIA.

VEHICLE-SHACKLE.

1,343,709.                    Specification of Letters Patent.     Patented June 15, 1920.

Application filed March 22, 1917. Serial No. 156,752.

*To all whom it may concern:*

Be it known that I, EARLE E. CHAPMAN, a citizen of the United States of America, residing at Los Angeles, in the county of Los Angeles and State of California, have invented a new and useful Vehicle-Shackle, of which the following is a specification.

An object of the invention is to provide a device which may be locked on an automobile tire for the purpose of rendering more hazardous any attempt to steal said automobile while at the same time not absolutely preventing its operation. The extra hazard, to the thief, is introduced by the fact that I provide a short wedge shaped spike which is driven into the surface of the street at each revolution of the wheel thus leaving a plain and distinctive trail.

It is quite essential to the success of my invention that the parts be so proportioned that they will not be distorted or injured by the operation of the automobile with the parts in place as otherwise a thief by simply running the automobile a short distance could break or bend the parts so that the continuity of the trail would be destroyed. It is further essential that the device be so made that the automobile can be operated with the device in place without injury to the device or automobile as it is often necessary to move automobiles in the absence of the owner as in the case of fire and owners often absentmindedly start to operate their automobiles with the device in place.

Further objects and advantages will be set forth more in detail hereinafter.

The accompanying drawings illustrate an embodiment of my invention and referring thereto:

Figure 1 is a perspective of said device.

Fig. 2 is a vertical section thereof, the key-operated means being shown in elevation.

Fig. 3 is a section on line 3—3 in Fig. 2.

Fig. 4 is a plan view of the lock.

Fig. 5 is a section of said lock taken on line 5—5 in Fig. 4.

Fig. 6 is a section on line 6—6 in Fig. 2.

The device comprises two members—1 and 2, which are hinged together at their outer ends at one side at 3 and are secured by key-operated lock means at their inner ends, said members 1 and 2 being adapted to embrace and fit around the tire and rim of an automobile wheel; one of said members, for example, member 1, being provided with a spike indicated at 4, adapted to serve as a bumping device in the rotation of the wheel.

These parts are preferably of hardened steel or other material sufficiently hard and strong to make it difficult to cut or break the device. The spike 4 may be formed with inclined side faces 5 and inclined end faces 5' meeting at an edge 6 adapted to extend transversely of the device so as to be adapted to form a distinguishing mark in the roadway.

The hinge is preferably of the construction shown in Figs. 2 and 3, comprising a pivot 3 extending transversely across the transverse projection 4 through a bore 9 in tongue 10 on member 2 and mounted in side walls or flanges 7' of the deep recess 7 in member 1, said tongue 10 fitting between the side walls 7' and extending beyond the said pivot and formed at its outer end with a lower face 12 adapted to engage with an inclined shoulder or seat 13, formed as a wall of recess 7, so that when the member 2 is in closed position on the member 1, the engagement of the face 12 within the seat 13 will prevent dislodgement or separation of the member 2 from the member 1 by outward pressure on member 2. Members 1 and 2 are further provided with shoulders 8 and 8' adjacent to hinge part 10, which are in engagement when the parts are in closed position so as to prevent inward movement. Pivot pin 3 is seated in a recess 3' in one side wall 7' and the other end is brazed or welded in the other side wall 7', so as to conceal and protect the pivot pin from being tampered with; but if any person should bore through the pin, so as to remove the same, the engagement of the face 12 on part 10 with the shoulder or seat 13 on the part 1, and the engagement of shoulder 8' in member 2 with shoulder 8 on member 1 will prevent separation of said parts as long as the key-operated means is locked, even if the hinge pin is removed. The hinge or pivot pin is only necessary to hold the parts in hinged relation when they are in open or partly open position.

The lock or key-operated means are preferably formed on coupling members 14 and 15 on the respective members 1 and 2 and consist for example of keeper means 16 on coupling member 15, and a lock embedded in member 14. Said lock may comprise a body 17 fitted in a suitable bore 18 in member 14 and held by suitable means such as 17' and a rotative key-operated member 19 fitting in a bore 20 in the said body and provided with a key slot 21 adapted to receive a key indicated at 22 in Figs. 5 and 6. A retainer and stop plate 23 is secured to the inner end of the body 17, for example by screws 24 and is provided with an opening 25 fitting around a reduced portion or neck 26 of the rotative lock member, so that said retaining plate, when fastened in position, will hold said rotative member from longitudinal movement in the body 17. Screws 24 may have flat faces 23' for engaging the wall of bore 20 to prevent turning and loosening of said screws when the retaining plate is in position in said bore. Said plate 23 is formed at one side of said opening 25 with a slot 27, whereby it may be inserted over said neck and the walls or edges 29 and 30 at the ends of said slot, serving also as stop means for engaging with the key 22 to limit the rotative movement of the lock member 19 in the body 17. The lock member 19 and body 17 may be provided with any suitable pin tumbler mechanism, or other means, for normally locking the rotative lock member from rotation in the body 17, and for permitting such rotation only when the proper key has been inserted in the slot 21. The lock further comprises a bolt or locking member 32 provided with a cross bar 33 adapted to engage keeper 16 formed as shoulder means in a recess 34 in member 15. I prefer to connect said bolt member 32 with the locking cylinder 19 by a joint which will transmit the rotative movement from one to the other, but will protect the delicate mechanism in the lock from jar. For this purpose, said bolt may be provided with a socket 36 engaging endwise with the retaining plate 23 and thereby transmitting endwise pressure to the non-rotatable lock member 19, said socket fitting around the head 31 at the inner end of the lock-member 19, but leaving a free space at the outer end of said lock member, so that said socket and bolt are free from longitudinal engagement with the rotatable lock member, and with a cross pin or member 37 extending across said socket and engaging within a transverse groove 38 in the lock member 19. A hub 39 on said bolt fits in a bore portion 40 within the coupling member 14 so that the said bolt member 32 is mounted to move rotatably under the operation of the key-operated locking means, but its mounting is independent of the key-operated locking means and any sudden jar applied to said lock bolt; for example, hammering on the device, will not be communicated to the tumbler or pin mechanism of the lock, but will be taken up by the bearing of socket 36 on retaining plate 23, and through the latter and the body 14, by the member 1.

Said locking device may be further protected by means of a flange 41 on coupling member 14 fitted over the coupling member 15 in such manner as to cover and protect the joint between said members and to prevent the entry of a picking tool or other instrument, or of dirt.

The method of operation of my invention is as follows:—

The device is locked in place on the wheel with the spike 4 projecting radially from the tread of the tire in such a position that it is forced into the roadway as the wheel revolves making a distinctive mark which can be easily followed. In practice the device is secured on the right hand front wheel of the automobile where it is readily applied from the curb and where it is in plain sight in the event that anyone attempts to start the automobile with the device in place. It should be noted, however, that the spike 4 is sufficiently small to pass readily under the mud guard of the automobile so that the automobile can be moved with the device in place, in case of emergency.

What I claim is:

1. A bumping device adapted for attachment to vehicle wheels, comprising two members hinged together and adapted to extend around the rim and tire of the wheel, one of said members being provided with a bumping projection and said members having coupling parts, one of which is formed with a keeper and the other is provided with a key operated locking means, having a rotatable key operated member, and a bolt adapted to engage said keeper on the first named coupling part and having a coupling connection with the said rotatable key operated member to be rotated therewith, said bolt having endwise engagement with the part of the lock in which said rotatable member rotates, but free of endwise engagement with said rotatable member, so as to prevent jar on said bolt being transmitted to said key operated member.

2. A device adapted for attachment to vehicle wheels comprising two members; one member being constructed with a transverse projection at its outer end having a deep recess providing a pocket, an outwardly and upwardly inclined shoulder at the base of the recess and an opening at one side of the transverse projection and the other member being constructed with a wedge shaped tongue seating on the inclined shoulder and means for fastening the inner ends of the members together.

3. A device adapted for attachment to vehicle wheels comprising two members; one member being constructed with a transverse projection at its outer end having a deep recess providing a pocket, an outwardly and upwardly inclined shoulder at the base of the recess and an opening at one side of the transverse projection and the other member being constructed with a tongue seating on the inclined shoulder, means for fastening the tongue to the transverse projection so as to prevent separation of the members and means for fastening the inner ends of the members together.

4. A device adapted for attachment to vehicle wheels comprising two members; one member being constructed with a transverse projection at its outer end having a deep recess providing a pocket, an opening at one side of the transverse projection and inclined side faces and inclined end faces meeting at an edge extending transversely of the device and the other member being constructed with a tongue seating in the opening and means for fastening the inner ends of the members together.

5. A device adapted for attachment to vehicle wheels comprising two members; one member being constructed with a transverse projection at its outer end having a deep recess providing a pocket, an outwardly and upwardly inclined shoulder at the base of the recess and an opening at one side of the transverse projection, side walls having shoulders, and inclined side faces and inclined end faces meeting at an edge extending transversely of the device, and the other member being constructed with a tongue seating on the base shoulder and with shoulders seating against the shoulders of the walls and means for fastening the inner ends of the members together.

6. A vehicle shackle for an automobile tire comprising a member shaped to conform to the curvature of the tire; a spike tapered to form a sharp wedge extending across the device parallel to the axis of the wheel and rigidly secured to said member, said spike being of such size and shape as to readily pass under the mud guard of the automobile with the device in place on a tire, and to make a large and distinctive mark or trail on the surface of the street; and means for detachably locking said member in place on said tire, the above enumerated parts being so proportioned that they will not be distorted or injured by the operation of the automobile with the device in place thereon.

7. A vehicle shackle for an automobile tire comprising a member fitting over the tread of the tire and extending upwardly and fitting inside the felly of the wheel on which the tire is placed; a projection formed on said member in such a position that it extends radially from the tread of the tire with the device in place; and means for locking said member on said wheel.

8. A vehicle shackle for an automobile tire comprising a member fitting over the tread of the tire and extending upwardly and fitting inside the felly of the wheel on which the tire is placed; a projection formed on said member in such a position that it extends radially from the tread of the tire with the device in place; a link pivoted to said member near said projection; and means for locking the free end of said link to said member near the felly of said wheel.

In testimony whereof I have hereunto set my hand, at Los Angeles, California, this 12th day of March, 1917.

EARLE E. CHAPMAN.